United States Patent [19]
Griffith et al.

[11] Patent Number: 5,346,575
[45] Date of Patent: Sep. 13, 1994

[54] GLASS FIBER INSULATION AND PROCESS

[75] Inventors: Edward J. Griffith, Manchester; Toan M. Ngo, Eureka, both of Mo.

[73] Assignee: Monsanto Company, St. Louis, Mo.

[21] Appl. No.: 26,651

[22] Filed: Mar. 5, 1993

Related U.S. Application Data

[62] Division of Ser. No. 767,968, Sep. 30, 1991, Pat. No. 5,223,336.

[51] Int. Cl.$^5$ .............................................. B27N 3/00
[52] U.S. Cl. .................................. 156/62.6; 156/272.2
[58] Field of Search .................... 428/360, 361, 288; 156/272.2, 62.6

[56] References Cited

U.S. PATENT DOCUMENTS

| | | | |
|---|---|---|---|
| 2,405,884 | 7/1943 | Greger | 23/105 |
| 2,444,347 | 7/1944 | Greger et al. | 117/126 |
| 3,736,176 | 5/1973 | Francel et al. | 117/124 |
| 3,788,885 | 1/1974 | Birchall et al. | 117/126 |
| 3,899,342 | 8/1975 | Birchall et al. | 106/65 |
| 4,005,232 | 1/1977 | Colebourne et al. | 428/35 |
| 4,147,823 | 4/1979 | Lavallee | 428/35 |
| 4,379,616 | 4/1984 | Fleming et al. | 350/96.34 |

FOREIGN PATENT DOCUMENTS

| | | |
|---|---|---|
| 2156800 | 1/1973 | France . |
| 2176469 | 2/1973 | France . |
| 48-92690 | 12/1973 | Japan . |
| 60-209067 | 10/1985 | Japan . |
| 2149453 | 6/1990 | Japan . |
| 1192304 | 5/1970 | United Kingdom . |

OTHER PUBLICATIONS

Monsanto Technical Bulletin No. T–236, 1971, p. 5.

*Primary Examiner*—James J. Bell
*Attorney, Agent, or Firm*—R. Loyer

[57] ABSTRACT

There is disclosed novel glass fiber particularly useful for preparing formed insulating articles having on the surface of the fibers an amorphous aluminum phosphate polymer wherein the polymer resiliently tacks the glass fibers together so as to provide regain of shape after deformation of the fibers as by compression. Also disclosed is a process for preparing glass fiber articles wherein the fibers are contacted with an ionic polymer which is then dehydrated to form an amorphous non-hygroscopic polymer.

6 Claims, 1 Drawing Sheet

GLASS FIBER INSULATION AND PROCESS

This is a division of application Ser. No. 07/767,968, filed Sept. 30, 1991 U.S. Pat. 5,223,336.

This application relates to novel glass fiber articles of manufacture useful as insulation and to a process of manufacture of glass fiber insulating material. More particularly, this application relates to glass fibers bound by a thin coating of an aluminum phosphate ionic polymer converted to an amorphous polymer after application to the fiber.

BACKGROUND OF THE INVENTION

Coatings for glass articles are numerous in both kind and purpose. The versatility of glass in recent years has caused the industry to apply coatings to glass, particularly in the form of fibers, to impart a particular physical property to the fiber. Protective coatings for glass fibers are disclosed in U.S. Pat. No. 2,444,347 to Greger et al. providing resistance to alkaline environment and to bond the fiber together. Of particular interest were glass fibers of very small diameter, termed therein "glass wool". In this form there is a large surface to volume ratio. The coating imparts some protection to the surface exposed to hostile environments. Colloidal solutions of aluminum phosphates are employed to mold glass-wool into shaped articles. The aluminum phosphates employed in the coating process are prepared in accordance with U.S. Pat. No. 2,405,884 to Greger.

Technical Bulletin I-236 published by Monsanto Company also suggests the use of colloidal aluminum phosphates as binding agents for glass fiber mats and insulation referring to the above-mentioned patent to Greger et al.

Glass fiber structures having superior heat resistance are described in Japanese Kokai No. 48 92690. According to this publication, glass fiber especially useful under elevated temperatures is provided by coating the glass fiber with a solution of aluminum phosphate or aluminum phosphate-chrome oxide complex to a thickness of from 0.1 to 10 microns. The coated fiber is heated to at least 150° C. to form a uniform crystalline coating on the surface of the fiber.

Water-soluble solid aluminum phosphate complexes and binder compositions for refractory compositions or alumina are disclosed in U.S. Pat. No. 3,899,342 to Birchall et al. The complex is provided by mixing a solution of aluminum orthophosphate having an Al:P molar ratio of substantially 1:1 with anions of a carboxylic acid or a mineral oxy-acid and curing the phosphate binder at a temperature of from 80° C. to 200° C. or higher. Also disclosed are cold curing methods which employ a curing agent such as magnesium oxide. Cast articles are formed wherein the refractory is placed in a mold. Oxyacids, such as citric and oxalic acids, are suggested for complexing agents with the orthophosphate.

In U.S. Pat. No. 4,147,823 to Lavalee, an ink for glass and ceramic substrates can be formulated by reacting an aluminum salt of a weak organic acid such as a stearate or palmitate with phosphoric acid to provide a matrix of insoluble aluminum phosphate cement. The complex contains filler and color pigment components which are caused to adhere to glass surfaces such as electric light bulbs. The bonding agent is heat cured at about 300° C. to form an adhesively bonded mark on the glass.

Low density, high heat resistant glass fiber insulation is prepared according to Kokai No. 60-209067 to Suganuma et al. by impregnating a glass fiber needle mat with a slurry comprising an aqueous solution of an aluminum or magnesium phosphate and one or more refractory compositions such as alumina, kaolin, feldspar, etc. The glass fiber, in the form of a needle mat, is impregnated with the slurry and dried at 120° C. for about one hour followed by two additional hours at 320° C. to provide a molded refractory article.

A broad range of inorganic fibers are treated with a biphosphate to provide heat and flame resistance, durability and adhesion on the surface of the fibers according to Japanese Kokai No. 2-149453. Metals employed to form the biphosphate in aqueous solution are metals of Groups I, II and III of the periodic table with aluminum and magnesium preferred. The biphosphate is sprayed onto fibers, such as glass fibers, whereupon the fiber surface is partially dissolved so that the fibers are bonded in block form or bonded together providing a non-woven cloth with superior heat resistance. The biphosphate is said to be polymerized and solidified on the surface of the fiber.

Modern glass fiber insulation materials comprise very small diameter filaments and are commonly provided with organic resin coatings for several purposes. First, the brashness of glass fiber is reduced so that the amount of dust and breakage of filaments during shipping and handling is reduced. Further, glass fiber insulation is commonly supported on a substrate, such as paper or aluminum which provides, in addition to support, also insulating value. The insulation is usually prepared in a certain thickness thereby providing a desired amount of insulating value. During packaging and shipping the insulation is compressed to conserve space but when unpackaged at the location of use, the insulating material on the substrate is expected to expand so as to provide insulating value to the degree required. Another function of the organic resin coating on the glass fiber is to provide sufficient flexibility of the glass filaments such that the filaments regain most of the original thickness needed to provide the expected insulating value after packaging and unpackaging. While providing the above-described desirable results, organic resins have the possibility of contributing to environmental problems in waste disposal and in the event of combustion in the structure being insulated may emit undesired fumes. Organic resins are also combustible.

There is needed a more environmentally advantageous and effective coating for glass fiber, particularly in the insulation function where substrate support is employed. There is desired, for environmental reasons, a suitable replacement for the organic resins in glass fiber insulation.

BRIEF DESCRIPTION OF THE INVENTION

In accordance with this invention, there is provided novel glass fiber articles suitable for insulating purposes and a process for preparing such articles. In accordance with this invention, glass fibers are treated with an aqueous acid aluminum phosphate solution. The aqueous solution is prepared by combining $Al_2O_3$, orthophosphoric acid and water in a molar ratio of $Al_2O_3/P_2O_5$ of less than 1 and preferably in the range of from 1 to 2 to 1 to 4, more preferably from 1 to 3. Sufficient water is included to provide a free flowing solution and may be up to about 95% by weight. The amount of water referred to is both combined and free water. An ionic polymer is formed in aqueous solution.

The treatment provides a small amount of solution on the fiber surface which is then converted to a water insoluble, amorphous polymer by the application of heat and removal of water. Prior to conversion of the solution to the amorphous state the glass fibers are compiled onto a substrate causing the fibers to form a lattice like structure wherein numerous fiber—fiber contact points are established. Because the aqueous solution is very fluid, it flows along the surface of the fibers and collects at fiber—fiber contact points due to surface tension. The fiber lattice is then subjected to heat treatment to remove water and to form the amorphous polymer. It has been found that when the fiber lattice is formed in this manner there is provided a resilient lattice structure. In accordance with this invention, there is provided an excellent tacking agent for the glass fibers which allows the glass fiber article to substantially recover its shape and size after compaction. Generally, the amount of amorphous polymer needed to tack the glass fiber satisfactorily is in the range of from about 1% to about 5% of the total weight of the glass fiber.

Polymerization of the acid phosphate is achieved by heating the treated fiber whereby water is removed to form an amorphous, non-hygroscopic polymer. Typical means to remove water from the ionic polymer may be employed such as electric or gas fired waffle ovens, infrared or microwave ovens.

DETAILED DESCRIPTION OF TIME INVENTION

Figure 1:
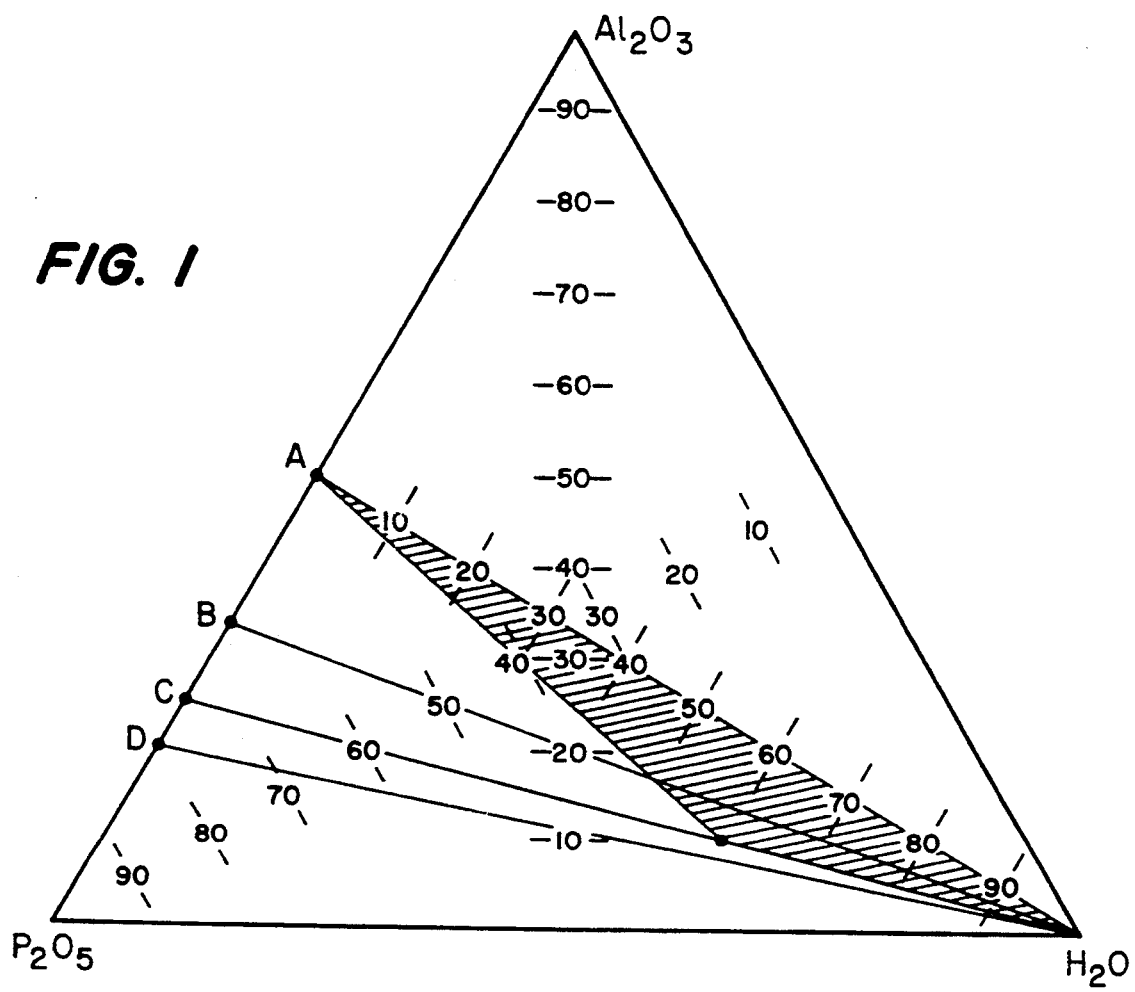
FIG. 1 is a diagram showing the ratios of $Al_2O_3$, $P_2O_5$ and water in the solutions employed to treat the glass fiber in accordance with this invention. The preferred composition of the ionic aluminum phosphate polymer solution of this invention to be applied to the fiberglass fibers is shown by the shaded area in FIG. 1. Lines A, B, C and D indicate solutions containing Al:P molar ratios of 1:1, 1:2, 1:3 and 1:4 respectively.
Figure 2:
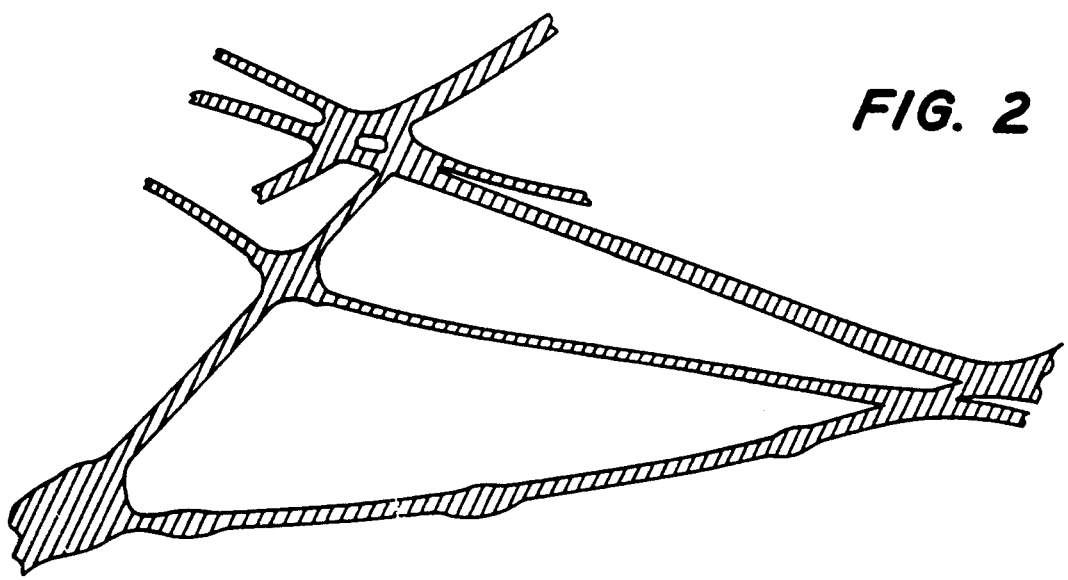
FIG. 2 is a greatly enlarged portion of a photomicrograph showing a segment of fiberglass which has been treated in accordance with this invention. There is shown in FIG. 2 the accumulation of amorphous polymer at the intersection of the fibers whereby the fibers are resiliently held together.

The water soluble ionic aluminum phosphate polymer is prepared by combining aluminum oxide, such as $Al_2O_3.3H_2O$, with ortho-phosphoric acid and water in the molar ratio noted above. In practice the aluminum oxide is added to the water-phosphoric acid mixture which has been heated to a temperature above about 100° C. A clear viscous solution results which can be diluted with water to provide a solution easily applied to glass fibers such as by spraying the fibers at a convenient location after filament formation and preferrably before combination into an article for use as insulating material. As will be shown in the Examples below, the viscosity of the coating solutions of this invention can be adjusted by the amount of water included therein. One advantage of such adjustment is to provide a suitable viscosity for the particular means employed to apply the coating solution to the fiber glass. It is not important as to the exact time or location for the application of the aqueous solution.

After application of the aqueous solution to the glass fiber, the treated fiber is subjected to polymerization condition(s) wherein the soluble acid aluminum phosphate is converted to a water insoluble, amorphous polymer by removal of water.

As noted above, the removal of water is performed by any suitable means such as by heating the treated fiber. It is important to control the removal of water whether conducted by air convection, furnace, oven or microwave, so as to produce the amorphous polymer. If the removal of water is insufficient, the desired phase change does not occur and the residue may be hygroscopic. If the removal of water is accompanied by excessive heat and water removal, an undesired crystalline aluminum phosphate is produced. In either of the above cases, the desired amorphous polymer is not formed in sufficient amounts to impart the desired properties in the glass fiber article.

It has been found that the desired water insoluble amorphous polymer is formed by heating the treated glass fiber to a temperature in the range of from about 350° C. to about 400° C. for about 45 to about 90 seconds. The relationship of time and temperature is regulated so as to remove the above-noted amount of water from the solution so as to form the desired amorphous polymer.

Treatment of the glass fibers in accordance with this invention does not necessarily entail the complete coating of the fiber with the ionic polymer. However, there should be a sufficient amount of solution on the crossover points of the very fine fibers with each other to provide a resilient tacking force by the amorphous polymer of sufficient strength to hold the shape of the article into which it has been formed prior to heating. That is, the shape of the article is resumed after compaction and to the approximate original size.

In addition, other inorganic acids may also be included in minor amounts. Inorganic acids may include, for example, boric acid, which is added for the purpose of preventing the components of the aqueous solution from salting out and may be added in amounts of from about .0.06% to about .0.5 percent, by weight, based upon amount $Al_2O_3/P_2O_5$ included therein. As will be shown below in the preferred embodiments, the aqueous solution is usually provided by combining aluminum oxide (including the various hydrates) in water with orthophosphoric acid. Following addition, the solution is formed upon heating to a temperature in the range of from about 105° C. to about 120° C. for a period of from about 30 to about 40 minutes. The concentration of the aqueous solution can be provided over a broad range and is mainly determined by the equipment employed in its application to the glass fiber. When the solution is desirably sprayed onto the glass fiber an aqueous solution may be prepared over a broad range of from about 5% to about 30%, by weight, although there is no intention of limiting this invention by such concentration as there are several suitable means for applying the solution to the fiber.

DESCRIPTION OF THE PREFERRED EMBODIMENTS

The following examples illustrate the preparation of compositions useful in the process of this invention. In these examples percent is expressed as percent by weight unless otherwise noted.

EXAMPLE 1

Into a 2 L ceramic container there were placed phosphoric acid and distilled water. This solution was heated to approximately 80° C. and then aluminum oxide trihydrate was added slowly. The mixture was stirred while heating to a temperature in the range of from 105° C. to about 110° C. until a clear solution was obtained. The stock solutions prepared by this procedure were diluted to 13.25% concentration by addition of distilled water to render them less viscous before spraying onto the glass fiber as described in Example 2 below. Three stock solutions were prepared by the above procedure as noted below. To one stock solution a small amount of boric acid was added for the purpose of preventing precipitation due to salting out. The stock solutions contained the following ingredients:

| Ingredient | a | b | c |
|---|---|---|---|
| $Al_2O_3 \cdot 3H_2O$ | 155.42 g | 155.42 g | 155.42 g |
| $H_3PO_4$-85.9% | 689.75 g | 710.44 g | 710.44 g |
| $BH_3O_3$ | | | 0.75 g |
| $H_2O$ | 161.88 g | 161.88 g | 161.88 g |

EXAMPLE 2

Viscosity measurements were made with solutions a,b and c of Example I. Water was added to reduce the concentration of the solution for the purpose of observing the effect of concentration upon viscosity. The ionic aluminum phosphate polymer content for each test solution is given in weight percent in Table I below. The measurements were made with a Brook-Field viscometer Model RVT and the results summarized in Table I wherein the viscosity is reported in centipoise units.

TABLE I

| Temp °C. | a 73.98% | a 63.10% | a 50.48% | b 71.20% | b 63.10% | b 50.48% | c 63.10% | c 50.48% |
|---|---|---|---|---|---|---|---|---|
| 23 | 4950 | 210 | 32 | 1810 | 225 | 36 | 180 | 36 |
| 54 | 600 | 65 | 35 | 475 | 80 | 33 | 60 | 39 |

EXAMPLE 3

Standard commercial glass fiber insulation having a combination paper/aluminum backing and an insulation value rating of R-11 was obtained and stripped of its organic coating by heating 5 inch by 4 inch segments in a muffle furnace at 450° C.–470° C. for a period of from 45 minutes to 1 hour. After removal and cooling, the segments were weighed and then compressed evenly over their upper surface under a weight of 50 gms. for 5 seconds. The weight was removed and the thickness of the sample immediately measured. The layers of glass fiber were pulled apart and sprayed with the above-described solutions so as to provide sufficient material to enhance the recovery of the segment to its original size after compression as noted below. The segments were weighed immediately after spraying and then heated in a muffle furnace set at about 400° C. for a period of from 45 to 90 seconds. The segments were again removed from the furnace and cooled to room temperature. To test the ability of the segments to regain their original size after compression and release, the thickness of each segment was measured and then compressed evenly over their upper surfaces under a weight of 887 g for a period of 5 minutes. The compressed thickness was measured and, after removal of the weight, the thickness of each segment was again measured to determine the percentage regain of thickness according to the equation:

$$\% = \frac{(t_o - t_f) \times 100}{t_o}$$

wherein $t_o$ is the original thickness and $t_f$ is the thickness of the segment after compression and regain of thickness. In Table II below, there is presented test data obtained wherein the above-described segments were weighed and then treated with ionic polymeric aluminum phosphate solution (compositions a–c above). In Table II the following abbreviated notations have the following meanings:

I = initial weight of the segment before treatment.
T = weight of the treated segment.
C = weight of the segment after heating.
$T_1$ = initial thickness of the segment before treatment.
$T_2$ = thickness of the segment under compression after heat treatment.
$T_3$ = thickness of the segment after compression release.

Also included in Table II below is the weight percent of the amount of ionic aluminum phosphate applied to the segment and the percent regain of thickness calculated as shown above.

TABLE II

| Segment | Weight | | | | Regain | | | |
|---|---|---|---|---|---|---|---|---|
| | I | T | C | % | $T_1$ | $T_2$ | $T_3$ | % |
| Solution a: | | | | | | | | |
| 1 | 10.73 | 15.40 | 11.1 | 3.54 | 7.2 | 2.45 | 7.1 | 98 |
| 2 | 7.77 | 10.83 | 8.04 | 3.47 | 7.1 | 2.0 | 6.9 | 97 |
| 3 | 11.83 | 16.53 | 12.27 | 3.72 | 7.3 | 2.9 | 7.1 | 97 |
| 4 | 9.7 | 13.53 | 10.01 | 3.2 | 6.65 | 2.4 | 6.5 | 98 |
| Solution b: | | | | | | | | |
| 1 | 7.64 | 10.54 | 7.72 | 1.05 | 6.4 | 1.6 | 6.1 | 95 |
| 2 | 8.18 | 12.25 | 8.49 | 3.79 | 7.2 | 2.1 | 6.95 | 96 |
| 3 | 12.86 | 16.29 | 13.11 | 1.94 | 7.9 | 2.9 | 7.80 | 98 |
| Solution c: | | | | | | | | |
| 1 | 10.62 | 14.72 | 10.88 | 2.45 | 7.4 | 2.65 | 7.2 | 97 |
| 2 | 13.52 | 16.62 | 13.9 | 2.81 | 7.3 | 2.8 | 7.1 | 97 |
| 3 | 12.01 | 16.87 | 12.63 | 5.16 | 7.1 | 3.0 | 7.0 | 98 |
| Control - no resin: | | | | | | | | |
| 1 | | | | | 6.8 | 2.1 | 5.7 | 84 |
| 2 | | | | | 7.2 | — | 6.3 | 87.5 |
| Control - organic resin: | | | | | | | | |
| 1 | | | | | 7.2 | — | 7.0 | 98 |

The data in Table II above indicates the ability of the amorphous aluminum phosphate polymer to provide glass fiber insulating structures with regain ability equal to the organic resin now generally employed in commerce. Because the viscosity of the ionic phosphate polymer solution of this invention can be adjusted by varying the water content as shown in Table I above, the viscosity of previously employed organic coating solutions may be matched by the compositions of this invention. The amount of ionic polymer employed to treat the glass fibers to provide this result is generally in the range of above 1 percent, by weight of the fiber, while it is shown that amounts of up to about 5%, by weight of the fiber are also effective.

Increased amounts of the ionic polymer may be employed, but would not significantly improve the regain of thickness because lower amounts are shown to be effective to the extent of 98%. In addition to providing the above-noted resilience of the insulating articles, the coating of this invention is also capable of reducing the brashness of the protruding glass fibers. It has been noted that the treated fibers are substantially dust free during movement of the coated fibers. Because of the inorganic nature of the herein disclosed coating for glass fibers, there is offered the possibility of recycling cut ends of glass fiber articles which result from the forming and shaping operations during manufacture of insulating members containing said fibers. Further, the heating of the fibers treated in accordance with this invention, providing an amorphous polymer, results in the loss of water which is relatively benign to the environment. Structures containing the insulation treated in accordance with this invention are less likely to emit obnoxious fumes when subjected to high intensity heat such as when such structures catch fire, whereas the organic resins of current commerce are undesirable because of the fumes produced under such circumstances. The amorphous polymer produced in accordance with this invention is stable up to about 1300° C.

While the illustrative embodiments of the invention have been described with particularity, it will be understood that various other modifications will be apparent to and can readily be made by those skilled in the art without departing from the scope and spirit of the invention.

We claim:

1. A process for preparing a form retaining insulating body of glass fibers comprising applying to the fibers a tacking agent comprising an aqueous acid aluminum phosphate solution containing a molar ratio of $Al_2O_3$ to $P_2O_5$ of less than 1, shaping said body and then removing water from said tacking agent to form an amorphous, water insoluble, non-hygroscopic polymer whereby the glass fibers of the body form are resiliently bonded together.

2. A process of claim 1 wherein water is removed by heating the fibers by means selected from the group consisting of electric or gas fired ovens, microwave or infrared radiation.

3. A process of claim 1 wherein the ratio of $Al_2O_3$ to $P_2O_5$ is in the range of from about 1:2 to about 1:3.

4. A process for preparing a loose mass of glass fibers which comprises applying to the fibers a tacking agent comprising an aqueous acid aluminum phosphate solution containing a molar ratio of $Al_2O_3$ to $P_2O_5$ of from 1:2 to 1:4, and then removing water to form an amorphous, water insoluble, non-hygroscopic polymer.

5. A process of claim 4 wherein the ratio of $Al_2O_3$ to $P_2O_5$ is about 1:3.

6. A process of claim 4 wherein the water is removed by heating the fibers by means selected from the group consisting of electric ovens, microwave or infrared radiation.

* * * * *